UNITED STATES PATENT OFFICE.

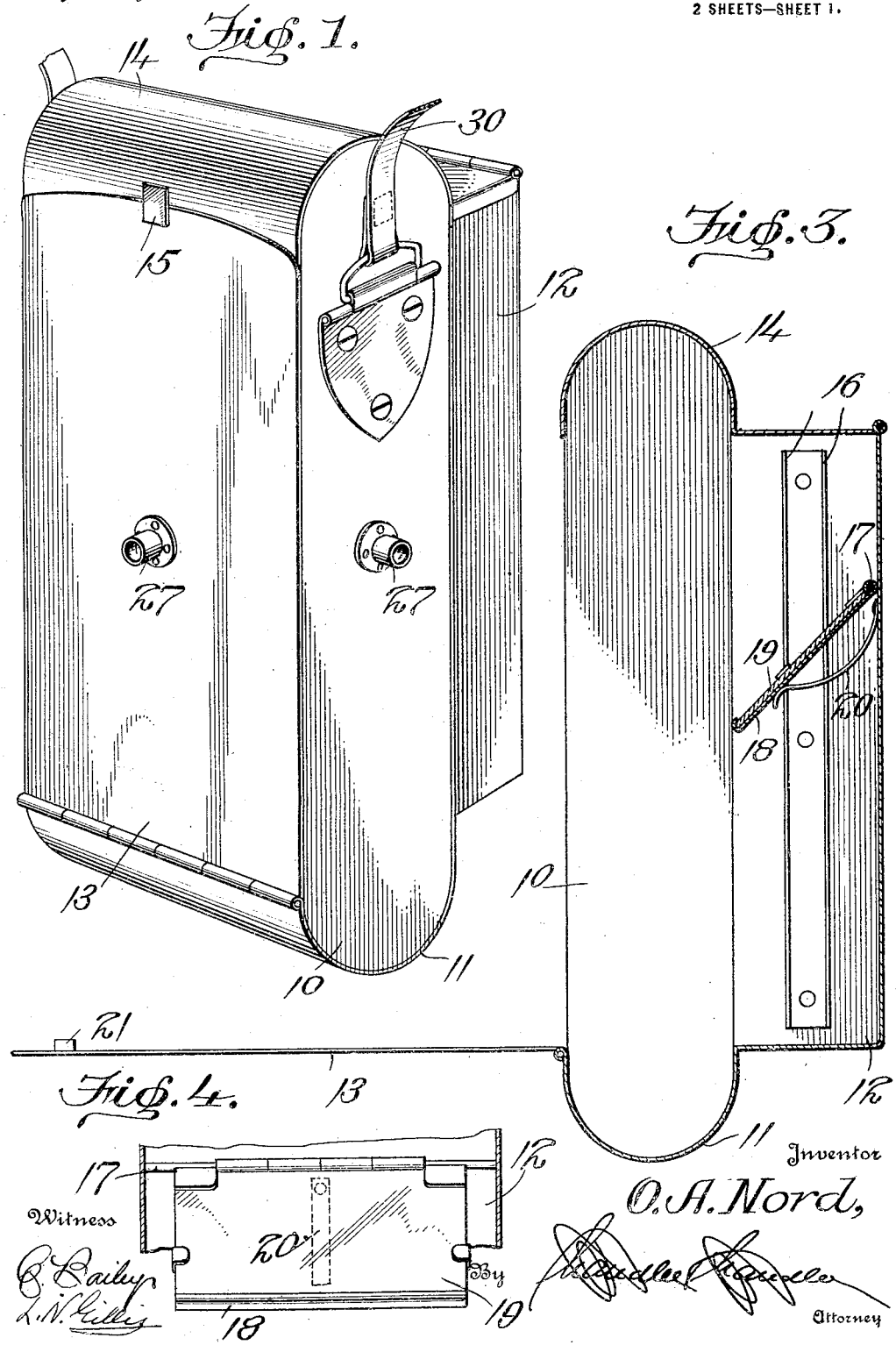

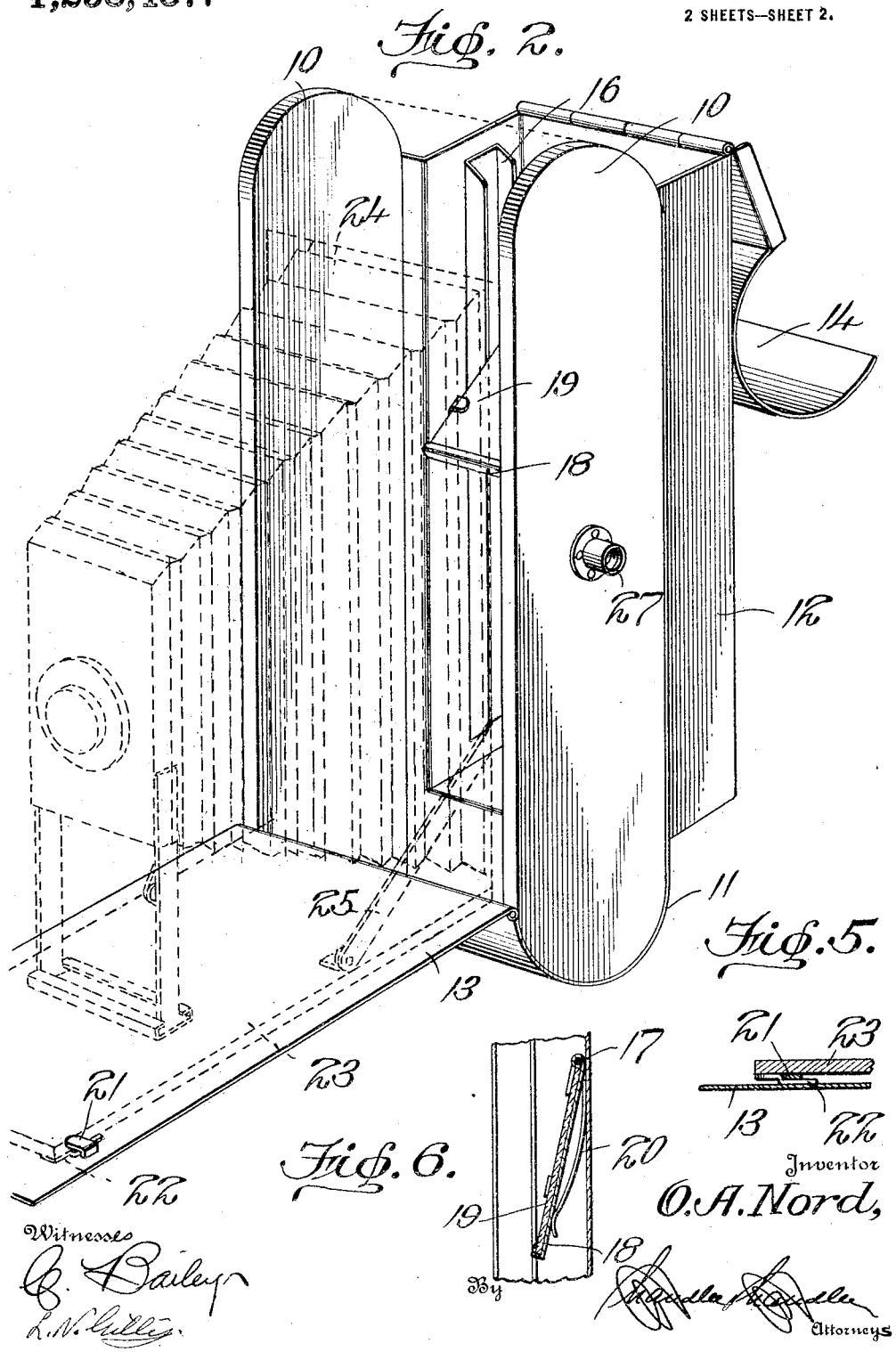

OLAF A. NORD, OF VAVENBY, BRITISH COLUMBIA, CANADA.

CAMERA-CARRYING CASE.

1,258,437.           Specification of Letters Patent.       Patented Mar. 5, 1918.

Application filed December 12, 1916. Serial No. 136,566.

*To all whom it may concern:*

Be it known that I, OLAF A. NORD, a subject of the King of England, residing at Vavenby, in the Province of British Columbia, Dominion of Canada, have invented certain new and useful Improvements in Camera-Carrying Cases; and I do hereby declare the following to be a full, clear, and exact description of the invention, such as will enable others skilled in the art to which it appertains to make and use the same.

This invention relates to carrying cases and has special reference to a camera carrying case.

One important object of the invention is to provide an improved form of camera carrying case wherein it is unnecessary to remove the camera from the case when taking pictures.

A second important object of the invention is to provide a camera carrying case having a door corresponding in position to the door of the camera proper, the two doors being provided with interlocking means so that when the door for the carrying case is opened, the camera door will also be opened.

A third important object of the invention is to provide a carrying case of this description with means for supporting it on a tripod arranged on the exterior of the case so that it is not necessary to remove the camera from the case to support said camera on a tripod.

A fourth important object of the invention is to provide an improved form of camera carrying case which is equipped with means for observing the focusing plate of the camera without removing the camera from said case.

A fifth important object of the invention is to provide a camera carrying case which is provided with means for erecting the inverted image thrown on the focusing plate and at the same time observing said image from above so that the camera does not have to be held in front of the face when focusing.

With the above and other objects in view as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a perspective view of the improved case in its closed position;

Fig. 2 is a perspective view of the improved case opened, a camera being shown in position therein;

Fig. 3 is a vertical median section through the case when opened;

Fig. 4 is a front view of the reflector;

Fig. 5 is a section taken longitudinally through the free end portion and at the side of the camera door with its catch member in elevation, the adjacent portion of the casing door with the keeper for the catch being in section.

Fig. 6 is a partial detail section showing the reflecting mirror in its collapsing position, with the plate carrier in position to hold said mirror collapsed.

In the embodiment of the invention herein illustrated there is disclosed a camera carrying case having the side members 10 which are of elongated form with rounded ends to accommodate the usual type of round ended camera. These side walls are connected at the bottom by a rounded bottom wall 11 and above the rear portion of said bottom wall 11 is a rear extension 12. Hinged to the upper edge of the front portion of the bottom wall is a door 13 and to the top of the rear wall of the extension is hinged a top door 14 which is so shaped as to close the top of the extension and the top of the body of the case, the door 13 being provided with any desired type of latch, as indicated at 15, for securing it to the door 14.

Extending downward from the top of the extension and in spaced relation to the back wall thereof are the plate holder guides 16 which are so spaced as to receive a plate holder between them and to permit another plate holder to lie between them and the body of the case. Extending across the casing extension from one side wall to the other is a bar 17 which carries a frame 18 supporting a mirror 19, the width of the frame and mirror being such as to permit the projection of the mirror between the guides 16 forwardly so that it may assume a position at 45 degrees to the rear wall. Furthermore, this mirror is so positioned that the image formed on the focusing plate of the camera is reflected in the mirror and may be observed from the top of the extension, said image being erect in relation to the observer.

In order to hold the mirror in the forwardly swung position, there is provided a spring 20 which has one end secured to the back wall of said extension and the other end of said spring rests against the back of the frame 18 and constantly urges the lower part of said frame and the mirror outward. It is to be noted that the back of the camera, when in the casing, is in such position, that the lower free edge of the mirror will contact therewith when the said mirror is at 45 degrees, and thus the camera acts as a stop for limiting the further forward swing of such free edge. Upon the outer face of the free end portion of the camera door 23 and at one side thereof is secured a catch 22 of general hook shape, the stem of the hook by means of which it is fastened to the door being, however, extended away from the bill of the hook which latter is in spaced relation to the camera door 23. A hook-shaped keeper 21 is secured to the inner face of the casing door 13 and when the camera is slid longitudinally into the casing after raising the door 14, this hook catch 22 engages behind the hook keeper 21 and serves to connect the two doors while permitting of sliding movement of one with respect to the other; a necessary provision when the doors are simultaneously opened and closed. By reason of this connection of the two doors, the opening of the door 13 effects an opening of the door 23 which is limited by the usual pivoted brace arm 25.

In order to support the device so that a tripod may be used without taking the camera out of the case, the casing is provided with the usual tripod screw sockets 27.

In the operation of the device, it is merely necessary to open the case door. This will cause the opening of the camera door and, upon removal of the plate holders, the image formed on the focusing glass or plate may be observed from the top of the extension in the mirror. The camera front is then pulled out in the usual manner and focused. Then a plate holder may be inserted in the camera back, the latter moving into the forward space formerly occupied by one of the plate holders and the pictures can then be taken in the ordinary way, the exposure being made by pressing a bulb or release lever or the like according to the fitting of the camera.

It is to be observed that the picture may be taken with the case held in the hand or suspended from the shoulder by the usual shoulder strap 30, or a tripod may be used, the tripod screw fitting in one or the other of the sockets on the casing. It will also be obvious that the camera can at any time be removed from the casing and used in the ordinary manner.

The casing may be made of any desired materials, but it is preferred that the interior shall be lined with some black material or, when wood or metal is used, given a dull black finish by the means of stain or paint.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

What I claim is:—

1. The combination with a camera-carrying case having a door, of a camera in the case provided with a door registering with the door of the case and means connecting the doors for movement of the camera door into and out of closed position under the influence of corresponding movement of the casing door.

2. The combination with a camera-carrying case having a door, of a camera in the case having a door registering with that of the case, and a hook on one of the doors, and a keeper on the other door with which the hook is slidably engaged in position for movement of the camera door into and out of closed position under the influence of corresponding movement of the casing door.

3. A camera and plate holder carrying case having a front provided with a door, a rearward extension opposite said door, and having an open top, means to close said top, plate holder guides extending downward from the top in spaced relation to the rear wall of the extension, a mirror swingingly mounted in the extension between said guides and rear wall, and a spring urging said mirror into angular position.

4. A camera and plate holder carrying case having a front provided with a door, a rearward extension opposite said door and having an open top, means to close said top at will, plate holder guides extending downward on the side walls of the extension in spaced relation to the rear wall, a mirror having its upper edge hinged to said rear wall, and movable into the space between the guides and rear wall, and a spring carried by the rear wall and urging the lower end of the mirror forward.

In testimony whereof, I affix my signature, in the presence of two witnesses.

OLAF A. NORD.

Witnesses:
  CHARLOTTE GRAHAM,
  BEATRICE SMITH.

Copies of this patent may be obtained for five cents each, by addressing the "Commissioner of Patents, Washington, D. C."